United States Patent
Murata (10) Patent No.: US 8,123,239 B2
(45) Date of Patent: Feb. 28, 2012

(54) KNUCKLE AND METHOD OF MANUFACTURING KNUCKLE

(75) Inventor: Satoshi Murata, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 184 days.

(21) Appl. No.: 12/679,544

(22) PCT Filed: Sep. 23, 2008

(86) PCT No.: PCT/IB2008/002476
§ 371 (c)(1),
(2), (4) Date: Mar. 23, 2010

(87) PCT Pub. No.: WO2009/040631
PCT Pub. Date: Apr. 2, 2009

(65) Prior Publication Data
US 2010/0207341 A1    Aug. 19, 2010

(30) Foreign Application Priority Data

Sep. 26, 2007  (JP) .................................. 2007-249327

(51) Int. Cl.
*B62D 7/18* (2006.01)
(52) U.S. Cl. ...... 280/93.512; 280/124.146; 280/124.154
(58) Field of Classification Search ............. 280/93.512, 280/124.145, 124.146, 124.154, FOR. 119, 280/124.125; 301/132, 135; *B62D 7/18; B60G 15/07, 15/14*
See application file for complete search history.

(56) References Cited

U.S. PATENT DOCUMENTS

| 4,582,338 A * | 4/1986 | Colanzi ................. 280/124.146 |
| 5,620,172 A | 4/1997 | Fulks et al. |
| 6,513,818 B1 * | 2/2003 | Seuser et al. ............. 280/93.512 |
| 6,902,176 B2 * | 6/2005 | Gottschalk ............... 280/93.512 |
| 2005/0077128 A1 | 4/2005 | Vissers et al. |
| 2006/0054423 A1* | 3/2006 | Murata ....................... 188/18 A |

FOREIGN PATENT DOCUMENTS

| CN | 1503740 A | 6/2004 |
| DE | 196 25 018 | 1/1998 |
| EP | 0 653 578 | 5/1995 |
| FR | 2 526 721 | 11/1983 |
| GB | 2 299 556 | 10/1996 |

(Continued)

OTHER PUBLICATIONS

Office Action issued May 16, 2011, in Chinese Patent Application No. 200880109182.9 (with English-language translation).

*Primary Examiner* — Ruth Ilan
*Assistant Examiner* — Keith Frisby
(74) *Attorney, Agent, or Firm* — Oblon, Spivak, McClelland, Maier & Neustadt, L.L.P.

(57) ABSTRACT

The invention provides a knuckle and a method of manufacturing the knuckle that do not cause an increase in the number of man-hours. A knuckle according to the invention is equipped with a knuckle part for fixing a shock absorber constituting a suspension unit, a bearing for rotatably supporting a wheel, and a knuckle part for supporting the bearing. The knuckle part is constructed by being extruded in an axial direction of the shock absorber and the knuckle part is constructed by being extruded in an axial direction of the bearing.

10 Claims, 7 Drawing Sheets

FOREIGN PATENT DOCUMENTS

| | | |
|---|---|---|
| JP | 5 161911 | 6/1993 |
| JP | 05185172 A * | 7/1993 |
| JP | 6-32245 | 2/1994 |
| JP | 06298114 A * | 10/1994 |
| JP | 8 324450 | 12/1996 |
| JP | 9 220918 | 8/1997 |
| JP | 11-736 | 1/1999 |
| JP | 11-294512 | 10/1999 |
| JP | 2000-304084 | 10/2000 |
| JP | 3215828 | 8/2001 |
| JP | 2004-524487 | 8/2004 |
| JP | 2006 27529 | 2/2006 |
| WO | 02 083438 | 10/2002 |

* cited by examiner

KNUCKLE AND METHOD OF MANUFACTURING KNUCKLE

BACKGROUND OF THE INVENTION

1. Field of the Invention

The invention relates to a knuckle suited to be applied to a suspension unit for a vehicle such as a passenger car, a truck, a bus or the like.

2. Description of the Related Art

As suspension units applied to vehicles, suspension units of an independent suspension type that independently support left wheels and right wheels with a view to improving the grounding property of the wheels have been employed. For example, suspension units of a multi-link type, a double wishbone type, and a McPherson strut type are well known. Especially a suspension unit of the McPherson strut type is constructed such that a knuckle for rotatably supporting each wheel is coupled to a vehicle body side via a lower arm, and that an intermediate part of this lower arm or the knuckle and the vehicle body side are coupled to each other by a shock absorber. The suspension unit of the McPherson strut type is therefore simple in structure and advantageous in space saving and cost reduction.

A knuckle for use in a suspension unit that is made of an aluminum extrusion material as described in Japanese Patent Application Publication No. 8-324450 (JP-A-8-324450) has been proposed for the purpose of enhancing mass productivity and reducing manufacturing costs.

However, in this knuckle described in Japanese Patent Application Publication No. 8-324450 (JP-A-8-324450), part of a bearing mounting body, an upper suspension arm mounting arm, and a lower suspension arm mounting arm are constructed as a first member made of an aluminum extrusion material, and the rest of the bearing mounting body and a tie rod mounting arm are constructed as a second member made of an aluminum extrusion material. The first member made of the aluminum extrusion material and the second member made of the aluminum extrusion material are so coupled as to be superimposed on each other in the direction of a central axis of a bearing. The knuckle is thereby constructed.

In the knuckle thus constructed, especially in the former one of the members, that is, the first member made of the aluminum extrusion material, there is caused a problem in that the number of man-hours increases as a result of the need to cut the extruded extrusion material by means of water injection, laser beams, or the like, namely, the need to machine the extruded extrusion material.

SUMMARY OF THE INVENTION

The invention provides a knuckle and a method of manufacturing the knuckle that do not cause an increase in the number of man-hours.

A knuckle according to a first aspect of the invention is a knuckle equipped with a damping member fixing part for fixing a damping member constituting a suspension unit, a bearing for rotatably supporting a wheel, and a bearing supporting part for supporting the bearing. The damping member fixing part is constructed by being extruded in an axial direction of the damping member. The bearing supporting part is constructed by being extruded in an axial direction of the bearing.

In the knuckle described herein, the damping member fixing part may be equipped with a grip part for gripping an enclosure for the damping member, and adjustment means for adjusting a gap between the grip part and the enclosure for the damping member.

In addition, the adjustment means may be a screw mechanism.

According to this construction, owing to the screw mechanism constructed of simple bolts and simple nuts, the damping member can be fixed to the knuckle by the grip part. The damping member fixing part is constructed by being extruded in the axial direction of the damping member, and the bearing supporting part is constructed by being extruded in the axial direction of the bearing. A construction eliminating a conventionally required bracket for fixing the damping member is thereby obtained. This construction makes it possible to reduce the necessity for machining such as cutting or the like, reduce the number of man-hours for manufacturing the knuckle, and reduce the cost of manufacturing to make the knuckle inexpensive. In addition, the bracket for fixing the damping member can be eliminated. Therefore, the knuckle can be reduced in weight. The bearing is typically a bearing member for rotatably supporting the wheel. This bearing member may be designed such that an inner race and a hub, which constitute the bearing member, are fitted to each other by a serration or the like, or that the inner race itself is integrated with the hub.

For structural reasons of the suspension unit, the axial direction of the damping member and the axial direction of the bearing do not coincide with each other. However, the knuckle adopts a two-piece structure mainly composed of the damping member fixing part and the bearing supporting part. Thus, the former one of the parts, namely, the damping member fixing part can be constructed by being extruded in the axial direction of the damping member, and the latter one of the parts, namely, the bearing supporting part can be constructed by being extruded in the axial direction of the bearing.

The damping member is typically a shock absorber, and the enclosure is a cylinder or a strut. In constructing the damping member fixing part and the bearing supporting part through extrusion, for example, aluminum or a material of an aluminum alloy type is used.

In the knuckle described herein, furthermore, the bearing supporting part may be equipped with a braking device supporting part for supporting a braking device.

In addition, the braking device supporting part may be so constructed as to protrude on an outer periphery side of the bearing.

According to this construction, the bearing supporting part constructed through extrusion can be endowed with a function of supporting the braking device. The braking device is typically a caliper brake.

In addition, the knuckle may include fixation means for fixing the bearing to the bearing supporting part, and the damping member fixing part and the bearing supporting part may be fixed to each other by the fixation means.

According to this construction, the knuckle can be constructed without using means such as welding or the like, by fixing the bearing to the bearing supporting part by the fixation means and then fixing the bearing supporting part to the damping member fixing part. Accordingly, the occurrence of an inconvenience resulting from heat strain generated in welding can be prevented among the bearing, the bearing supporting part, and the damping member fixing part.

In the knuckle, the fixation means can be typically constructed as follows.

That is, in the knuckle, the fixation means can be characterized by being equipped with a plurality of through-holes penetrating the bearing supporting part and the bearing, internal thread parts bored through the damping member fixing part at positions corresponding to the through-holes respectively, and a plurality of bolts having external threads screwed in the internal thread parts respectively to be inserted through the through-holes respectively.

According to this construction, the knuckle can be constructed in a reduced number of processes by inserting the plurality of the bolts through the through-holes respectively, screwing these bolts into the internal thread parts of the damping member fixing part respectively, and thereby fastening the bearing, the bearing supporting part, and the damping member fixing part together. In this construction, the bearing is typically a bearing member, and it is appropriate to provide the through-holes through an ear portion protruding on an outer periphery side of an outer race constituting this bearing member.

A joint surface of the damping member fixing part and a joint surface of the bearing supporting part, which are joined to each other by fastening the plurality of the bolts together, may be perpendicular to a radial direction of the damping member and perpendicular to an axial direction of the bearing. According to this construction, both the joint surface of the damping member fixing part and the joint surface of the bearing supporting part can be constructed through extrusion without the need for machining.

In addition, a first hole portion externally surrounding that part of the bearing member which protrudes inward with respect to the vehicle width direction may be provided through that part of the bearing supporting part which corresponds to the bearing member. A second hole portion may be provided around the first hole portion.

Thus, the second hole portion for reducing the weight of the bearing supporting part can be provided around the first hole portion. The first and second hole portions also assume the shapes of wall surfaces extending parallel to the axial direction of the bearing member, and are so shaped as to allow direct construction through extrusion.

A method of manufacturing a knuckle according to a second aspect of the invention includes extruding the damping member fixing part in the axial direction of the damping member, extruding the bearing supporting part in the axial direction of the bearing, and then fixing the damping member fixing part, the bearing supporting part, and the bearing to one another by the fixation means.

According to this construction, the aforementioned knuckle can be manufactured with a construction requiring a reduced number of processes of machining.

According to the invention, the knuckle and the method of manufacturing the knuckle that do not cause an increase in the number of man-hours can be provided.

BRIEF DESCRIPTION OF THE DRAWINGS

The foregoing and further features and advantages of the invention will become apparent from the following description of an example embodiment with reference to the accompanying drawings, wherein like numerals are used to represent like elements, and wherein.

DETAILED DESCRIPTION OF EMBODIMENT

The best mode for carrying out the invention will be described hereinafter with reference to the accompanying drawings.

Figure 1:
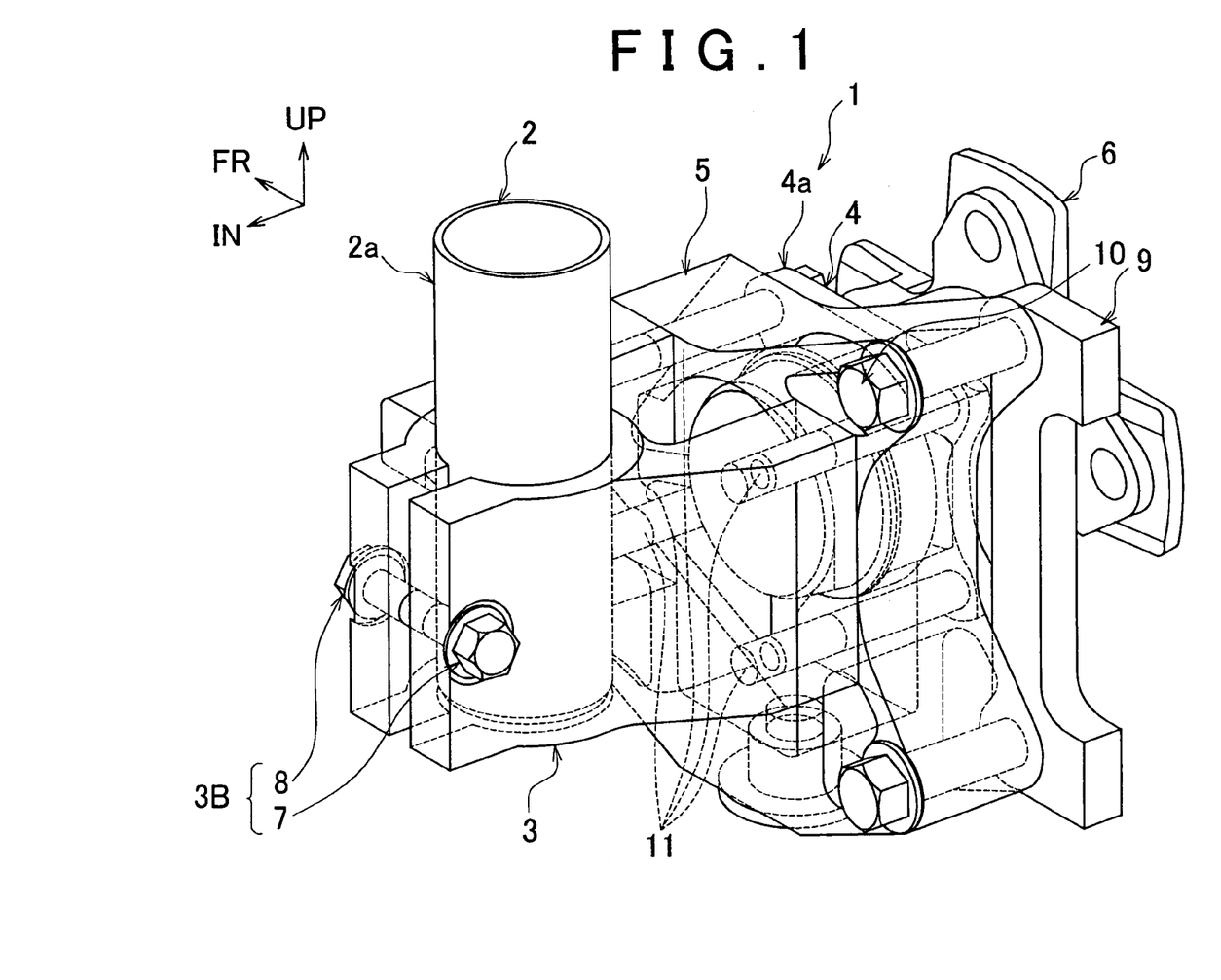
FIG. 1 is a schematic diagram showing an embodiment of a knuckle according to the invention.
Figure 2:
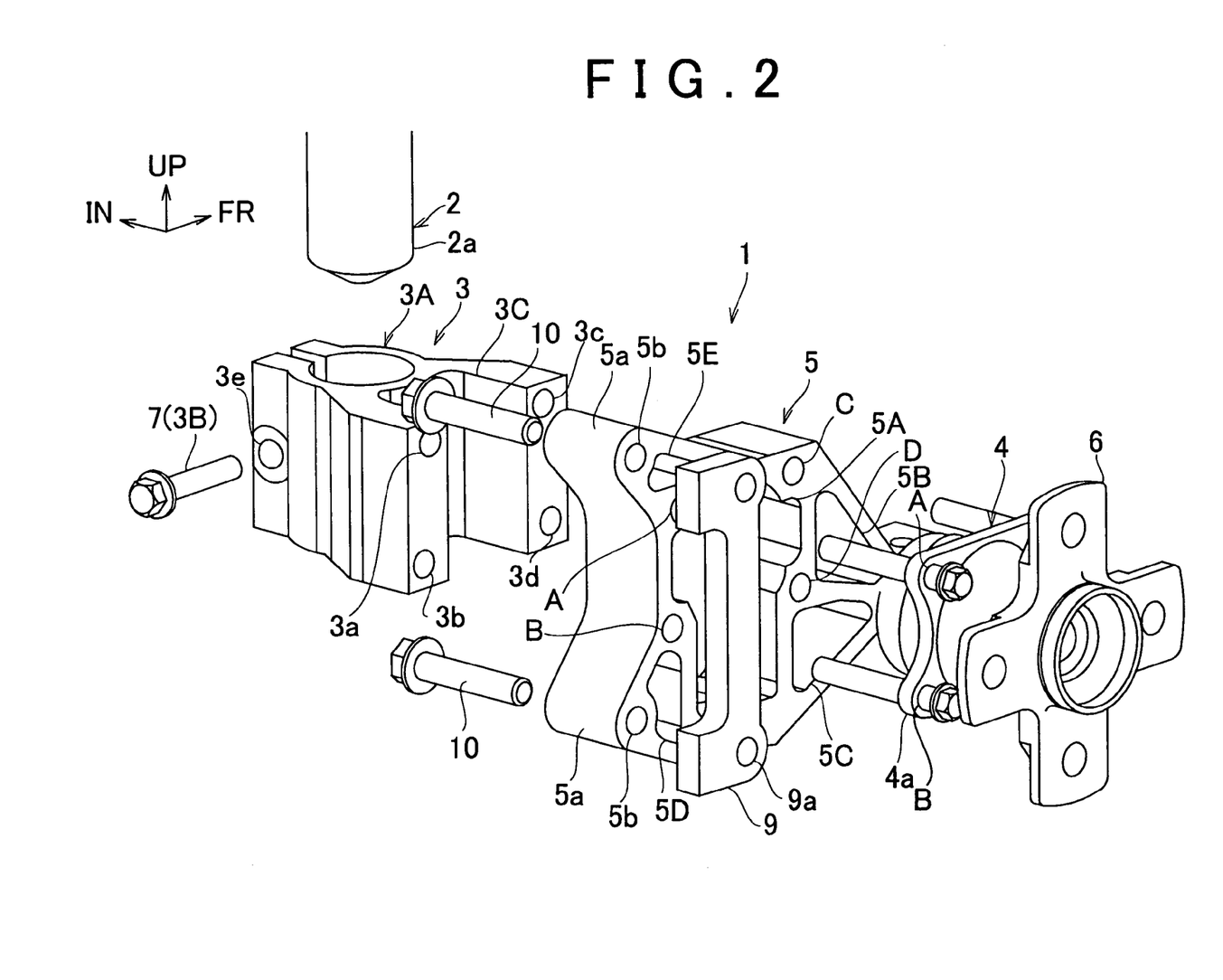
FIG. 2 is a schematic diagram showing the embodiment of the knuckle according to the invention.
Figure 3:
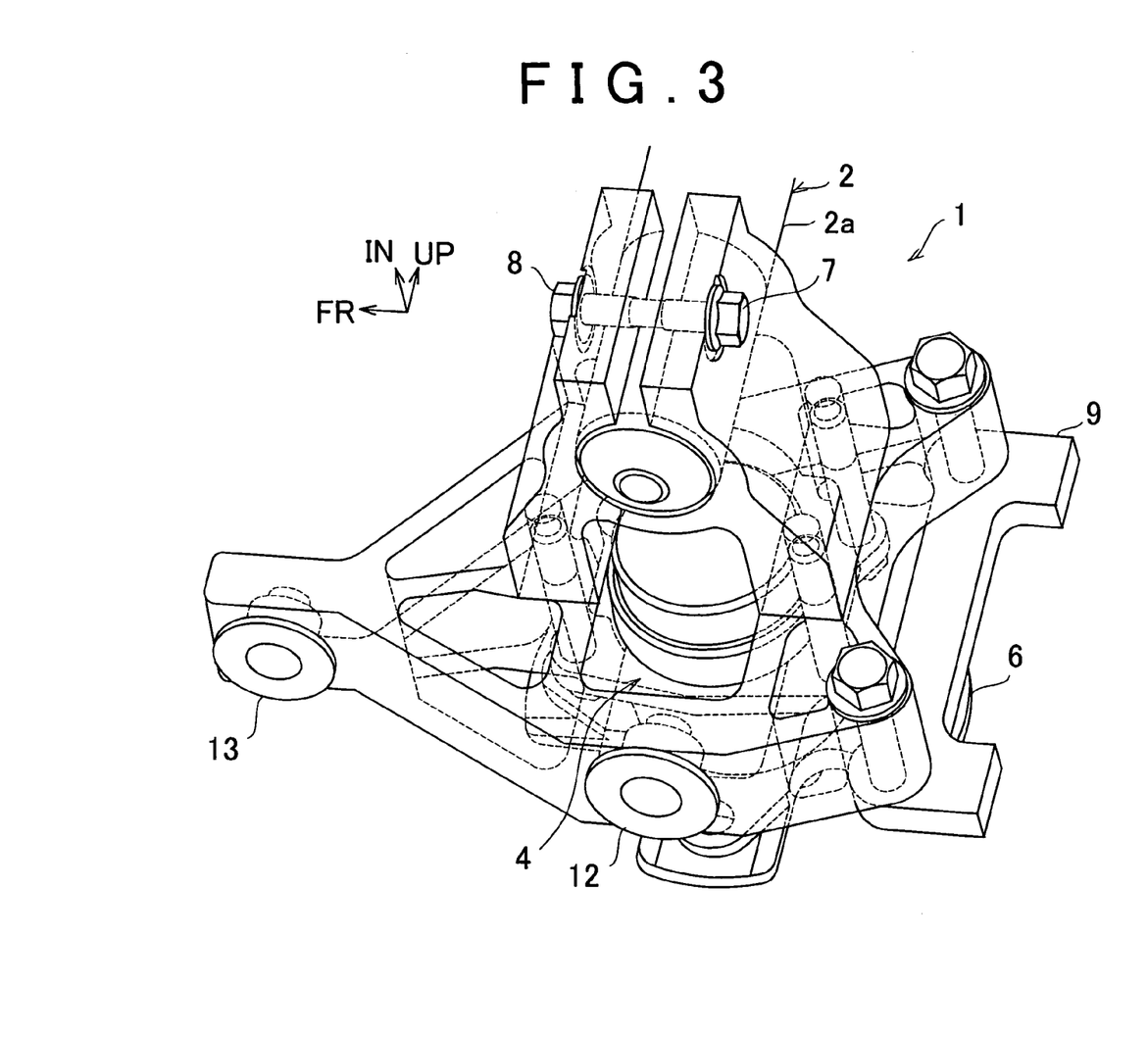
FIG. 3 is a schematic diagram showing the embodiment of the knuckle according to the invention.

FIG. 1 is a schematic diagram showing one embodiment of a knuckle according to the invention as viewed from a position located behind a vehicle and inside with respect to a vehicle width direction. FIG. 2 is a schematic diagram showing the embodiment of the knuckle according to the invention with its components arranged side by side in the vehicle width direction as viewed from a position located behind the vehicle and outside with respect to the vehicle width direction. FIG. 3 is a schematic diagram showing the embodiment of the knuckle according to the invention as viewed from a position located inside with respect to the vehicle width direction and below. In FIGS. 1 to 3, UP, FR, and IN denote an upward direction, a forward direction with respect to the vehicle, and an inward direction with respect to the width of the vehicle, respectively.

As shown in FIGS. 1 and 2, a knuckle 1 is equipped with a knuckle part 3 for fixing a shock absorber 2 constituting a suspension unit, a bearing member 4 for rotatably supporting a wheel (not shown), and a knuckle part 5 for supporting the bearing member 4. The shock absorber 2 constitutes a damping member, the knuckle part 3 constitutes a damping member fixing part, the bearing member 4 constitutes a bearing, and the knuckle part 5 constitutes a bearing supporting part. A hub 6 is fitted to an inner race of the bearing member 4 through a serration or the like and thereby integrally coupled thereto. The wheel (not shown) and a tire (not shown) are fixed to this hub 6 by a hub bolt (not shown).

In the knuckle 1 thus constructed, the knuckle part 3 is constructed by extruding aluminum, an aluminum alloy, or the like in an axial direction of the shock absorber 2, and the knuckle part 5 is also constructed by extruding aluminum, an aluminum alloy, or the like in an axial direction of the bearing member 4.

The knuckle part 3 is equipped with a grip part 3A for gripping a cylinder 2a constituting an enclosure for the shock absorber 2, and adjustment means 3B for adjusting a gap between the grip part 3A and the cylinder 2a of the shock absorber 2. The adjustment means 3B is a screw mechanism composed of a bolt 7 and a nut 8.

The grip part 3A of the knuckle part 3 externally surrounds the cylinder 2a, and assumes a generally cylindrical shape opening on the inside with respect to the vehicle width direction. The opening part of the grip part 3A protrudes inward with respect to the vehicle width direction. The bolt 7 is inserted through a hole portion 3e provided through this protruding part. The knuckle part 3 is provided on the outside thereof with respect to the vehicle width direction with a notch portion 3C for imparting elasticity to the grip part 3A.

Both this generally cylindrical grip part 3A and the notch portion 3C assume the shape of a wall surface extending parallel to the axial direction of the shock absorber 2, and are so shaped as to allow direct construction through extrusion.

In addition, the knuckle part 5 is equipped with a braking device supporting part 5a for supporting a brake caliper mounting 9 as a base of a caliper brake (not shown) constituting a braking device. This braking device supporting part 5a is so constructed as to protrude on an outer periphery side of the bearing member 4.

Two hole portions 5b are bored through this braking device supporting part 5a, and two internal threads 9a are bored through the brake caliper mounting 9 at positions corresponding to the hole portions 5b respectively. Bolts 10 are inserted through the hole portions 5b respectively and screwed into the internal threads of the brake caliper mounting 9 respectively. The brake caliper mounting 9 is thereby fixed to the braking device supporting part 5a.

A hole portion 5A externally surrounding that part of the bearing member 4 which protrudes inward with respect to the vehicle width direction is provided through that part of the knuckle part 5 which corresponds to the bearing member 4. Hole portions 5B, 5C, 5D, and 5E for reducing the weight of the knuckle part 5 are provided around this hole portion 5A. These hole portions 5A, 5B, 5C, 5D, and 5E also assume the shape of a wall surface extending parallel to the axial direction of the bearing member 4, and are so shaped as to allow direct construction through extrusion.

In addition, as fixation means for fixing the bearing member 4 to the knuckle part 5, four through-holes A, B, C, and D penetrating the knuckle part 5 and the bearing member 4 are provided through the knuckle part 5 and an ear portion 4a protruding on the outer periphery side of an outer race of the bearing member 4, and internal thread parts 3a, 3b, 3c, and 3d bored through the joint surface of the knuckle part 3 joined to the knuckle part 5 at positions corresponding to the through-holes A, B, C, and D respectively, and four bolts 11 having external threads screwed in these internal thread parts 3a, 3b, 3c, and 3d respectively to be inserted through the through-holes A, B, C, and D respectively are provided. The fixation means composed of these elements is used to fix the knuckle part 3, the knuckle part 5, and the bearing member 4 to one another.

More specifically, the four bolts 11 are inserted through the through-holes A, B, C, and D respectively, and the external thread parts of the bolts 11 are screwed into the internal thread parts 3a, 3b, 3c, and 3d of the knuckle part 3 respectively. The bearing member 4 is thereby fixed to the knuckle part 5, and the knuckle part 5 is then fixed to the knuckle part 3. In other words, the bearing member 4, the knuckle part 5, and the knuckle part 3 are fastened together by the four bolts 11 to be fixed to one another.

The suspension unit to which the aforementioned knuckle 1 is applied is constructed with the aforementioned shock absorber 2, a spring (not shown), a lower arm (not shown), and a tie rod (not shown). A simple description of components of the suspension unit to which this knuckle 1 is applied will be added hereinafter.

As shown in FIG. 3, the knuckle 1 is provided at a lower end thereof with a lower ball joint fastening portion 12. This lower ball joint fastening portion 12 is coupled to the lower arm (not shown) at an outer end thereof with respect to the vehicle width direction via a ball joint (not shown). Also, the knuckle 1 is provided at a front end thereof with a tie rod ball joint fastening portion 13. The tie rod (not shown) is coupled at an outer end thereof with respect to the vehicle width direction to this tie rod ball joint fastening portion 13 via a ball joint.

A rod (not shown) of the shock absorber 2 is coupled at an upper end thereof to a vehicle body side via a bush, and the cylinder 2a of the shock absorber 2 is coupled at a lower end thereof to the knuckle 1 by the grip part 3A of the knuckle part 3. Thus, the shock absorber 2 prevents, through a damping force thereof, the knuckle 1 from continuing to vibrate due to vibrations from a road surface that are transmitted from the tire and the wheel via the knuckle 1, and couples the knuckle 1 to the vehicle body side.

The spring is constructed by being sandwiched between a lower spring sheet (not shown) provided in the shape of a circular disc in the vicinity of an upper end of an outer peripheral face of the cylinder 2a of the shock absorber 2, and an upper spring sheet (not shown) provided in the shape of a circular disc in the vicinity of an upper end of the rod, and being so formed as to swirl around the rod. The spring reduces vibrations transmitted from the tire and the wheel to the vehicle body side via the knuckle 1.

The lower arm extends in the vehicle width direction, is coupled at an outer end thereof with respect to the vehicle width direction to the lower ball joint fastening portion 12 at the lower end of the knuckle 1 via a ball joint, and is rockably coupled on an inner side thereof with respect to the vehicle width direction to a suspension member (not shown) on the vehicle body side via a bush. The lower arm couples the knuckle 1 and the vehicle body side to each other.

The tie rod extends in the vehicle width direction, is coupled at an outer end thereof with respect to the vehicle width direction to the tie rod ball joint fastening portion 13 at a front end of the knuckle 1 via a ball joint, and is coupled on an inner side thereof with respect to the vehicle width direction to a rack bar of a steering unit (not shown). The tie rod transmits a steering force of the steering unit to the knuckle 1.

According to the knuckle 1 of this embodiment of the invention described above, the following operations and effects can be obtained. That is, through adjustment of the adjustment means 3B as the screw mechanism composed of the simple bolt 7 and the simple nut 8, the shock absorber 2 can be fixed to the knuckle 1 by the grip part 3A of the knuckle part 3.

The knuckle part 3 is constructed by being extruded in the axial direction of the shock absorber 2, and the knuckle part 5 is constructed by being extruded in the axial direction of the bearing member 4. The knuckle 1 can thereby be constructed with the conventionally required bracket for fixing the shock absorber 2 eliminated, while reducing the need for machining such as cutting or the like and making the number of man-hours as small as possible. As a result, the cost of manufacturing can be reduced to make the knuckle 1 inexpensive.

Furthermore, the bracket for fixing the shock absorber 2 can be eliminated. Therefore, the knuckle 1 can be reduced in weight.

For structural reasons of the suspension unit, the axial direction of the shock absorber 2 and the axial direction of the bearing member 4 do not coincide with each other. However, the knuckle 1 adopts the two-piece structure mainly composed of the knuckle part 3 and the knuckle part 5. Thus, the former one of the knuckle parts, namely, the knuckle part 3 can be constructed by being extruded in the axial direction of the shock absorber 2, and the latter one of the knuckle parts, namely, the knuckle part 5 can be constructed by being extruded in the axial direction of the bearing member 4.

Furthermore, in the knuckle 1, the knuckle part 5 is equipped with the braking device supporting part 5a for supporting the brake caliper mounting 9 as the base of the caliper brake (not shown), and this braking device supporting part 5a is so constructed as to protrude on the outer periphery side of the bearing member 4. The knuckle part 5 constructed through extrusion can thereby be endowed with the function of supporting the caliper brake.

Furthermore, in the knuckle 1, the knuckle part 5 is equipped with the fixation means for fixing the bearing member 4, and the same fixation means as this one is used to fix the knuckle part 3 and the knuckle part 5 to each other. The knuckle 1 can thereby be constructed without using means such as welding or the like, by fixing the bearing member 4 to the knuckle part 5 by the fixation means and then fixing the knuckle part 5 to the knuckle part 3. As a result, the occurrence of an inconvenience resulting from heat strain generated in welding can be prevented among three components, namely, the bearing member 4, the knuckle part 5, and the knuckle part 3.

The fixation means in the knuckle 1 is constructed by being equipped with the plurality of the through-holes A, B, C, and D penetrating the knuckle part 5 and the bearing member 4, the internal thread parts 3a, 3b, 3c, and 3d bored through the knuckle part 3 at the positions corresponding to the through-holes A, B, C, and D respectively, and the four bolts 11 having the external threads screwed in these internal thread parts 3a, 3b, 3c, and 3d respectively to be inserted through the through-holes A, B, C, and D respectively. Thus, the knuckle 1 can be constructed in a reduced number of processes by inserting the four bolts 11 through the through-holes A, B, C, and D respectively and screwing these bolts into the internal thread parts 3a, 3b, 3c, and 3d of the knuckle part 3 respectively to thereby fasten the bearing member 4, the knuckle part 5, and the knuckle part 3 together.

In the knuckle 1 illustrated in this embodiment of the invention, the joint surface of the knuckle part 3 and the joint surface of the knuckle part 5, which are joined to each other by fastening the four bolts 11 together, are perpendicular to a radial direction of the shock absorber 2 and perpendicular to the axial direction of the bearing member 4. The following operations and effects can thereby be obtained.

That is, both the joint surface of the knuckle part 3 and the joint surface of the knuckle part 5 can be constructed through extrusion without the need for machining. As a matter of course, in the case of a certain type of the suspension unit, the positional relationship between the axial direction of the shock absorber 2 and the axial direction of the bearing member 4 is not limited to the aforementioned relationship. In this case, therefore, it is necessary to finely adjust one or both of the joint surface of the knuckle part 3 and the joint surface of the knuckle part 5 by means of cutting.

In manufacturing the knuckle 1, the following manufacturing method may be used. The knuckle part 3 is extruded in the axial direction of the shock absorber 2 using a material such as aluminum, an aluminum alloy, or the like, and the knuckle part 5 is extruded in the axial direction of the bearing member 4 using a similar material. After that, the knuckle part 3, the knuckle part 5, and the bearing member 4 are fixed to one another by the aforementioned fixation means.

Thus, the aforementioned knuckle 1 can be manufactured with a construction requiring the least need for machining and a reduced number of processes.

In the foregoing embodiment of the invention, the design of the knuckle 1 applied to a driven wheel is illustrated. As a matter of course, however, the knuckle 1 according to the invention is also applicable to a driving wheel. The knuckle 1 according to this modification example will be described hereinafter using the drawings.

Figure 4:
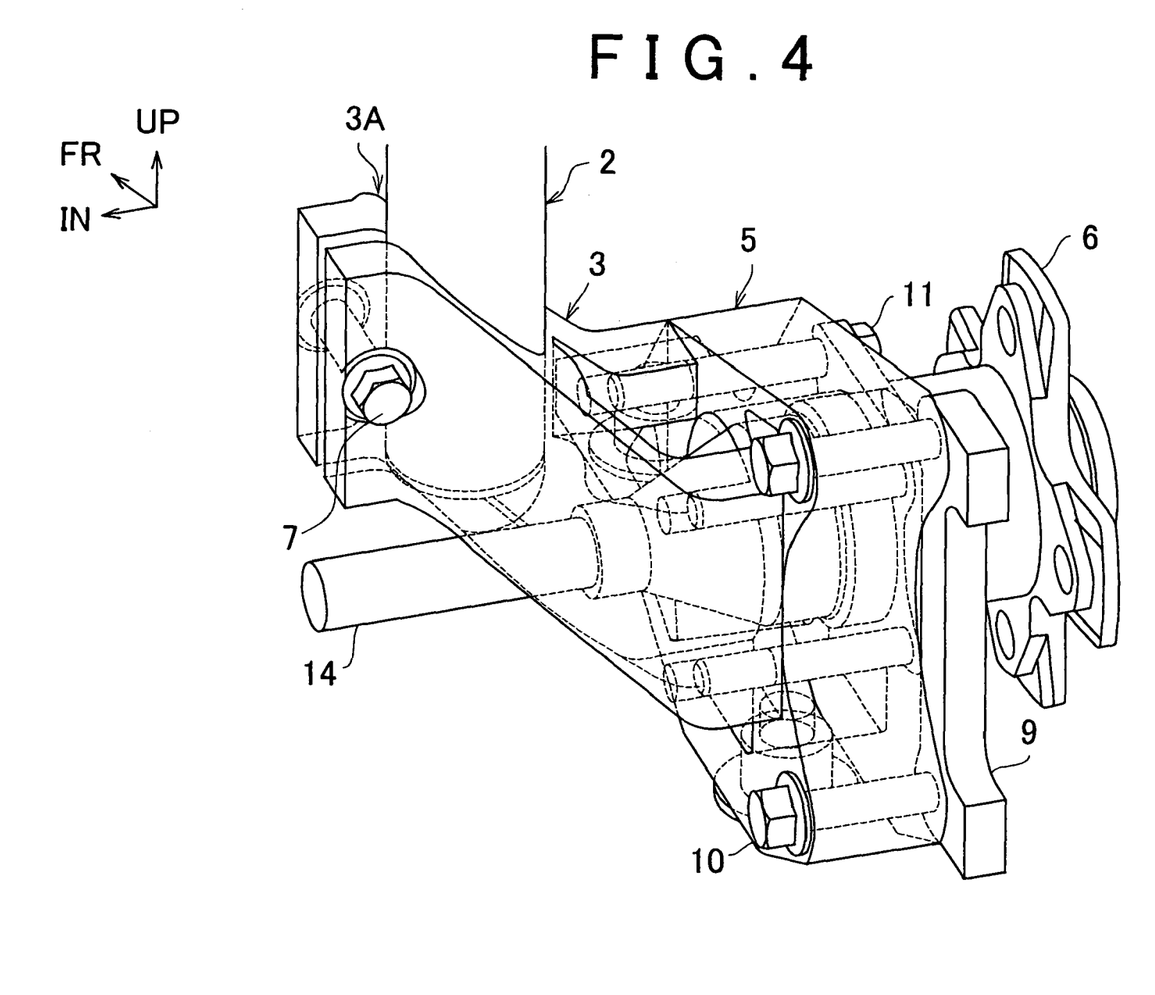
FIG. 4 is a schematic diagram showing a first modification example of the embodiment of the knuckle according to the invention.
Figure 5:
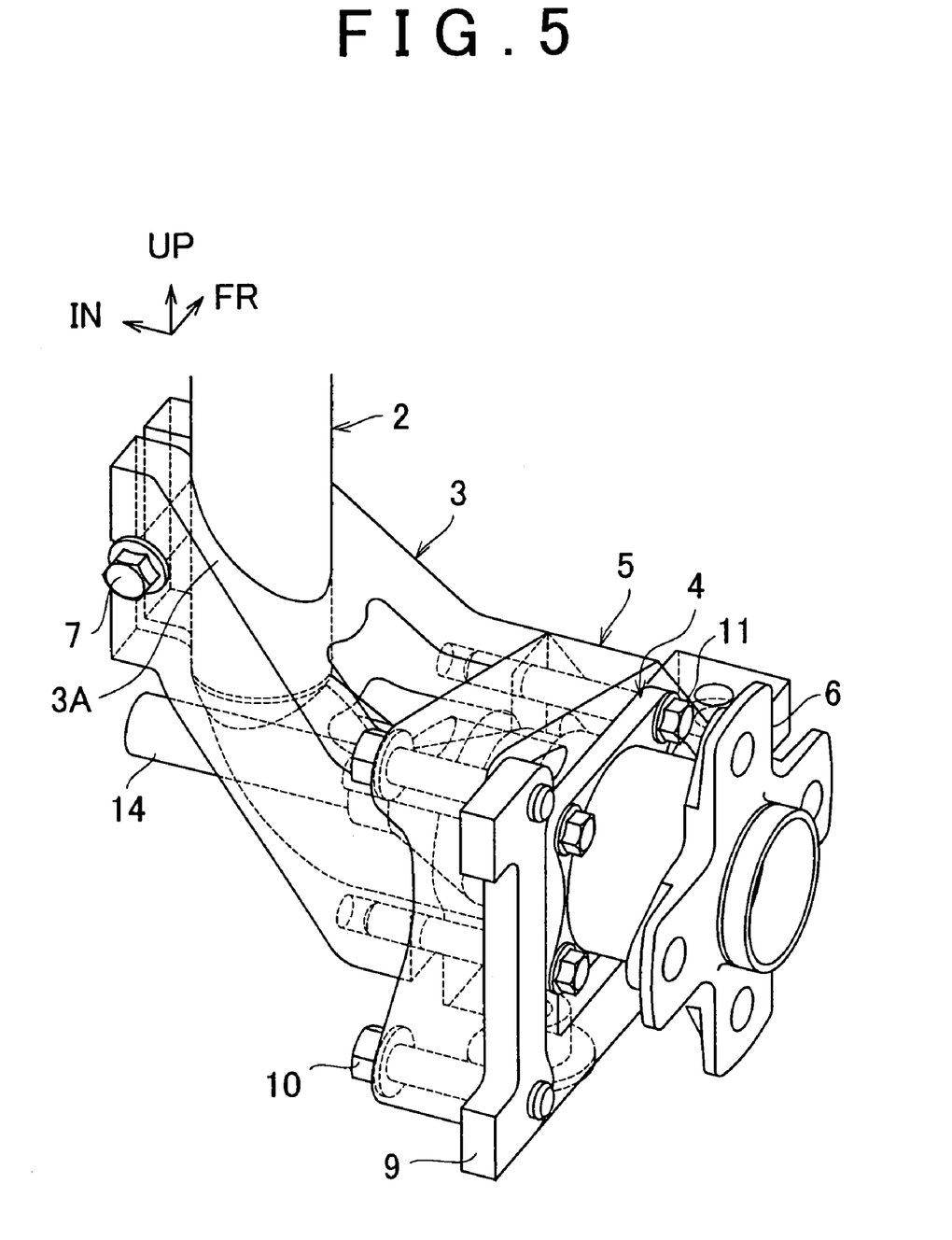
FIG. 5 is a schematic diagram showing the first modification example of the embodiment of the knuckle according to the invention.

FIG. 4 is a schematic diagram showing the first modification example of the knuckle according to the invention as viewed from a position located behind the vehicle and inside with respect to the vehicle width direction. FIG. 5 is a schematic diagram showing the first modification example of the knuckle according to the invention as viewed from a position located behind the vehicle and outside with respect to the vehicle width direction. In FIGS. 4 and 5, UP, FR, and IN denote an upward direction, a forward direction with respect to the vehicle, and an inward direction with respect to the width of the vehicle, respectively.

As shown in FIGS. 4 and 5, in the knuckle 1 applied to the driving wheel, a drive shaft 14 needs to be drivingly coupled to the hub 6 from inside with respect to the vehicle width direction. Therefore, the knuckle part 3 is constructed with the grip part 3A thereof offset upward with respect to the joint surface of the knuckle part 3 joined to the knuckle part 5.

In this case as well, the knuckle part 3 can be constructed through extrusion. The construction, operations, and effects of other basic component parts of this knuckle 1 are the same as those of the knuckle 1 illustrated in the embodiment of the invention and hence will not be described again below.

In each of the aforementioned embodiment of the invention and the first modification example thereof, the number of the bolts 11 is four, and the number of the corresponding through-holes is four. However, these numbers can be suitably changed. The knuckle 1 having the two bolts 11 and the two corresponding through-holes will be described hereinafter using the drawings.

Figure 6:
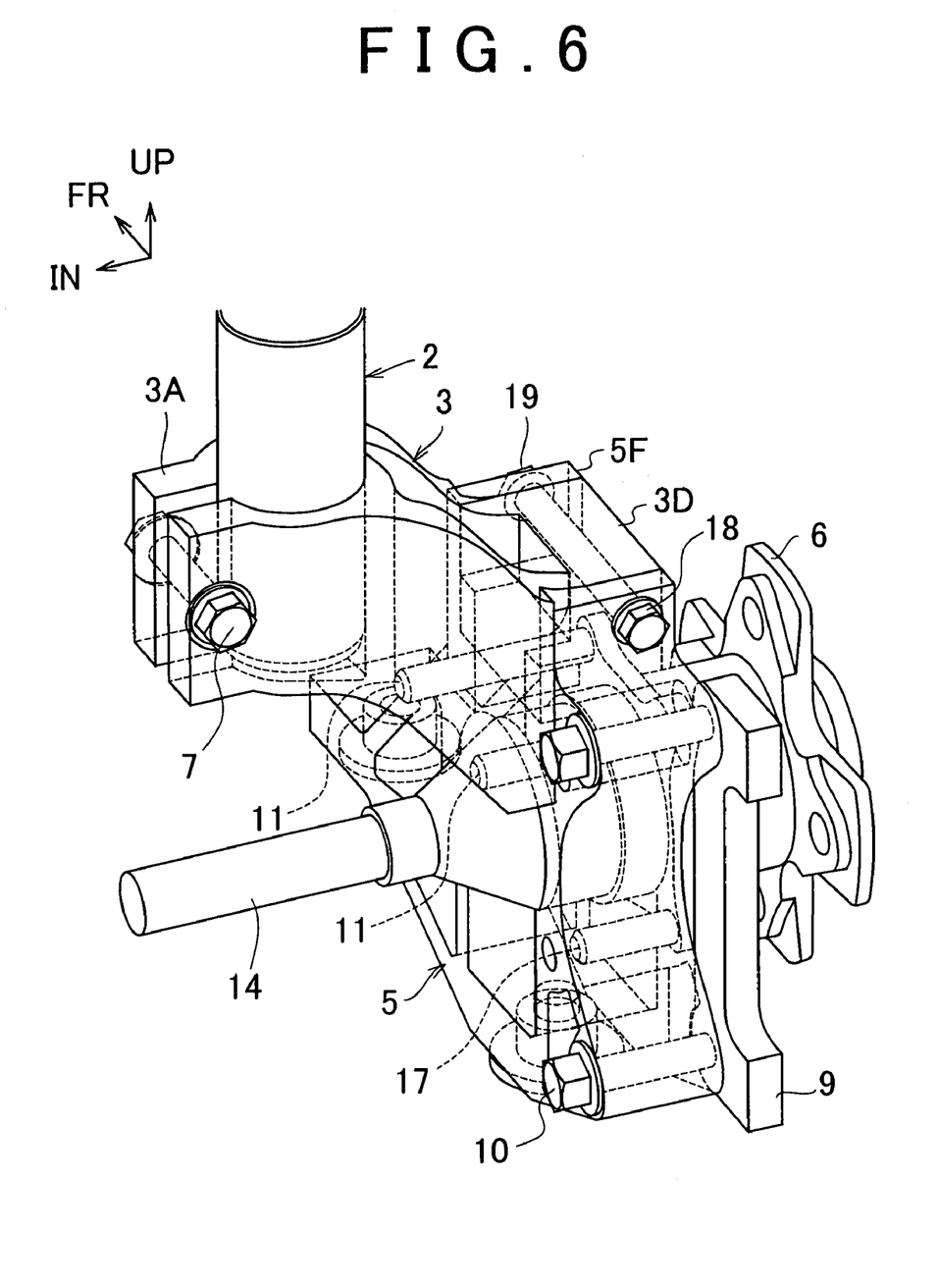
FIG. 6 is a schematic diagram showing a second modification example of the embodiment of the knuckle according to the invention.
Figure 7:
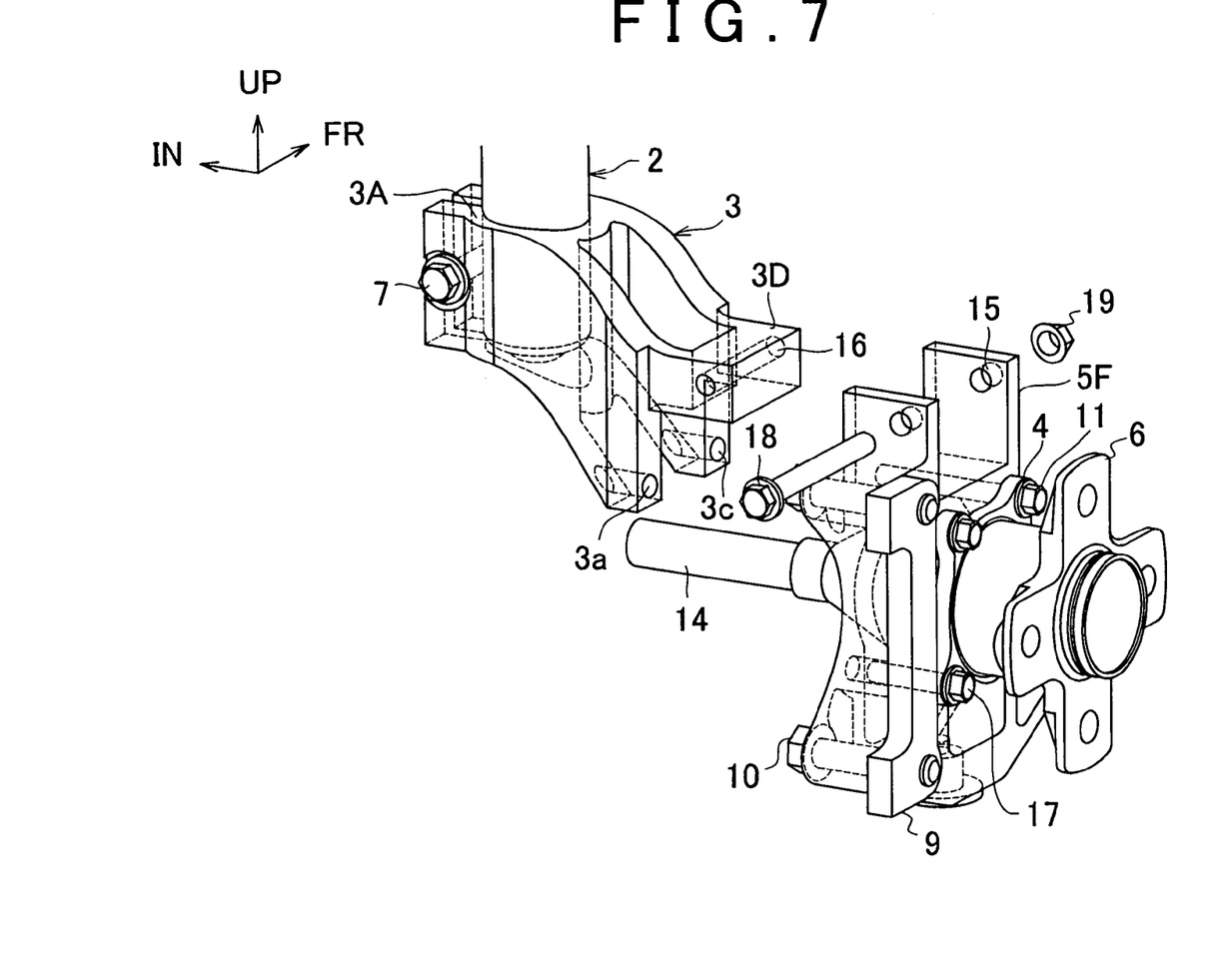
FIG. 7 is a schematic diagram showing the second modification example of the embodiment of the knuckle according to the invention.

FIG. 6 is a schematic diagram showing a second modification example of the knuckle according to the invention as viewed from a position located behind the vehicle and inside with respect to the vehicle width direction. FIG. 7 is a schematic diagram showing the second modification example of the knuckle according to the invention with the knuckle part 3 and the knuckle part 5 arranged side by side separately in the vehicle width direction as viewed from a position located behind the vehicle and outside with respect to the vehicle width direction. In FIGS. 6 and 7, UP, FR, and IN denote an upward direction, a forward direction with respect to the vehicle, and an inward direction with respect to the width of the vehicle, respectively.

As shown in FIGS. 6 and 7, in the knuckle 1 applied to the driving wheel, as is the case with that illustrated in the first modification example, the drive shaft 14 needs to be drivingly coupled to the hub 6 from inside with respect to the vehicle width direction. Therefore, the knuckle part 3 is constructed with the grip portion 3A thereof offset upward with respect to the joint surface of the knuckle part 3 joined to the knuckle part 5.

In addition, in the knuckle 1 according to the second modification example, the knuckle part 3 is equipped with a flange portion 3D protruding outward with respect to the vehicle width direction, and the knuckle part 5 is equipped with a flange portion 5F designed to protrude upward and sandwich the flange portion 3D in a longitudinal direction of the vehicle. The flange portion 5F is provided with a hole portion 15 penetrating in the longitudinal direction of the vehicle, and the flange portion 3D is provided with a hole portion 16 penetrating in the longitudinal direction of the vehicle.

As is the case with the knuckle 1 illustrated in the embodiment of the invention, the plurality of the through-holes A, B, C, and D penetrating the knuckle part 5 and the bearing member 4 are provided. The internal thread parts 3a and 3c are bored through the knuckle part 3 only at positions corresponding to the through-holes A and C respectively. Internal thread parts into which a bolt 17 for fixing the bearing member 4 to the knuckle part 5 is screwed are bored through the through-holes B and D respectively on the knuckle part 3 side.

In the knuckle part 3 and the knuckle part 5 that are thus constructed, the two bolts 11 are inserted through the through-holes A and C respectively and screwed into the internal thread parts 3a and 3c of the knuckle part 3 respectively to thereby fasten the bearing member 4, the knuckle part 5, and the knuckle part 3 together. As a result, the knuckle 1 can be constructed in a reduced number of processes. In addition, the bolt 17 is inserted through the through-holes B and D and screwed. The bearing member 4 can thereby be fixed more securely to the knuckle part 5.

Furthermore, central axes of the hole portion 15 of the flange portion 5F and the hole portion 16 of the flange portion 3D are made coincident with each other, a bolt 18 is thereafter inserted through the hole portion 15 and the hole portion 16, and a nut 19 is screwed onto an external thread portion of the bolt 18. The knuckle part 3 and the knuckle part 5 are thereby more securely fixed to each other.

In this case as well, the flange portion 3D assumes the shape of a wall surface extending parallel to the axial direction of the shock absorber 2 to allow direct construction through extrusion, so that the knuckle part 3 can be constructed through extrusion. By the same token, the flange portion 5F assumes the shape of a wall surface extending parallel to the axial direction of the bearing member 4 to allow direct construction through extrusion, so that the knuckle part 5 can also be constructed through extrusion.

The construction of other parts is similar to that of the knuckle 1 illustrated in the first modification example. Therefore, redundant description of the construction, operation, and effect is omitted.

Although the preferred embodiment of the invention has been described above in detail, the invention is not limited to the aforementioned embodiment thereof. The aforementioned embodiment of the invention can be subjected to various modifications and substitutions without departing from the scope of the invention.

The invention relates to a knuckle suited to be applied to a suspension unit for a vehicle, and can provide a knuckle and a method of manufacturing the knuckle that do not cause an increase in the number of man-hours through relatively simple means. Therefore, the invention is advantageously applied to various vehicles such as normal passenger cars, trucks, buses, and the like.

The invention claimed is:

1. A knuckle comprising:
   a wheel suspension damping member fixing part constructed as a profile by being extruded in an axial direction of a damping member, for fixing the damping member as a member constituting a wheel suspension unit;
   a bearing for rotatably supporting a wheel; and
   a bearing supporting part constructed as a profile by being extruded in an axial direction of the bearing, for supporting the bearing,
   wherein the damping member fixing part and the bearing supporting part are fastened together via joint surfaces so as to be fixed to one another, and
   wherein said joint surfaces are perpendicular to the radial direction of the damping member and the axial direction of said bearing.

2. The knuckle according to claim 1, wherein the damping member fixing part includes a grip part for gripping an enclosure for the damping member, and adjustment means for adjusting a gap between the grip part and the enclosure for the damping member.

3. The knuckle according to claim 2, wherein the adjustment means is a screw mechanism.

4. The knuckle according to claim 1, wherein the damping member fixing part and the bearing supporting part are made of aluminum or a material of an aluminum alloy type.

5. The knuckle according to claim 1, wherein the bearing supporting part is equipped with a braking device supporting part for supporting a braking device.

6. The knuckle according to claim 5, wherein the braking device supporting part is so constructed as to protrude on an outer periphery side of the bearing.

7. The knuckle according to claim 1, further comprising fixation means for fixing the bearing to the bearing supporting part, wherein the damping member fixing part and the bearing supporting part are fixed to each other by the fixation means.

8. The knuckle according to claim 7, wherein the fixation means includes a plurality of through-holes penetrating the bearing supporting part and the bearing, internal thread parts bored through the damping member fixing part at positions corresponding to the through-holes respectively, and a plurality of bolts having external threads screwed in the internal thread parts respectively to be inserted through the through-holes respectively.

9. A method of manufacturing the knuckle according to claim 7, comprising:
   extruding the damping member fixing part in the axial direction of the damping member;
   extruding the bearing supporting part in the axial direction of the bearing; and
   fixing the damping member fixing part, the bearing supporting part, and the bearing to one another by the fixation means.

10. The knuckle according to claim 1, wherein the bearing supporting part is provided with a first hole portion externally surrounding a part of the bearing which protrudes inward with respect to the vehicle width, and a second hole portion, which has a wall surface extending parallel to a wall surface of the first hole portion, around the first hole portion.

* * * * *